United States Patent
Nair et al.

(10) Patent No.: US 11,902,792 B2
(45) Date of Patent: Feb. 13, 2024

(54) UNIFIED SUBSCRIPTION IDENTIFIER MANAGEMENT IN COMMUNICATION SYSTEMS

(71) Applicant: NOKIA TECHNOLOGIES OY, Espoo (FI)

(72) Inventors: Suresh Nair, Whippany, NJ (US); Anja Jerichow, Grafing (DE); Nagendra S Bykampadi, Bangalore (IN); Dimitrios Schoinianakis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/045,370

(22) PCT Filed: Apr. 4, 2019

(86) PCT No.: PCT/EP2019/058530
§ 371 (c)(1),
(2) Date: Oct. 5, 2020

(87) PCT Pub. No.: WO2019/193105
PCT Pub. Date: Oct. 10, 2019

(65) Prior Publication Data
US 2021/0058776 A1    Feb. 25, 2021

(30) Foreign Application Priority Data

Apr. 5, 2018 (IN) .............................. 201841013099

(51) Int. Cl.
H04L 29/00         (2006.01)
H04W 12/72        (2021.01)
(Continued)

(52) U.S. Cl.
CPC ............ *H04W 12/72* (2021.01); *H04L 9/3073* (2013.01); *H04W 12/041* (2021.01); *H04W 12/06* (2013.01)

(58) Field of Classification Search
CPC ....... H04W 12/00514; H04W 12/0401; H04W 12/06; H04W 12/72; H04W 12/041;
(Continued)

(56) References Cited

U.S. PATENT DOCUMENTS 7,079,834 B2   7/2006  Kyung et al.
7,356,339 B2   4/2008  Nam
(Continued)

FOREIGN PATENT DOCUMENTS

CL    202002558       1/2021
CN    101800929 B     8/2014
(Continued)

OTHER PUBLICATIONS

"3rd Generation Partnership Project; Technical Specification Group Core Network and Terminals; Non-Access-Stratum (NAS) protocol for 5G System (5GS); Stage 3 (Release15)", vol. CT WG1, No. VI.0.0, Mar. 15, 2018 (Mar. 15, 2018) (Year: 2018).*
(Continued)

*Primary Examiner* — Jeffrey C Pwu
*Assistant Examiner* — Helai Salehi
(74) *Attorney, Agent, or Firm* — ALSTON & BIRD LLP (57) ABSTRACT

At given user equipment in a communication system, a unified subscription identifier data structure is constructed. The unified subscription identifier data structure includes a plurality of fields that specify information for a selected one of two or more subscription identifier types and selectable parameters associated with the selected subscription identifier type, and wherein the information in the unified subscription identifier data structure is useable by the given user
(Continued)

| Subscription identifier (SUCI, SUPI, IMSI) | | |
|---|---|---|
| MCC 402 | MNC 404 | UDM Selection parameter 406 |
| Encryption ON/OFF 408 | KDF 410 | KDF Optional parameters 412 |
| Identifier type SUPI/SUCI/IMSI 414 | ECIES Curve selected for encryption 416 | Ephemeral Public key pair 418 |
| Length of encrypted MSIN 420 | encrypted MSIN 422 | MSIN MAC 424 |
| Encryption Algorithm Identifier field 426 | | |

400 equipment to access one or more networks associated with the communication system based on an authentication scenario corresponding to the selected subscription identifier type. For example, during different authentication scenarios, the given user equipment utilizes the unified subscription identifier data structure to provide the appropriate subscription identifier (e.g., SUPI, SUCI or IMSI) and associated parameters for the given authentication scenario.

22 Claims, 8 Drawing Sheets

(51) Int. Cl.
  *H04W 12/041* (2021.01)
  *H04L 9/30* (2006.01)
  *H04W 12/06* (2021.01)
(58) Field of Classification Search
  CPC ..... H04W 12/009; H04W 8/26; H04W 8/183; H04L 9/3073; H04L 9/08; H04L 63/205; G06F 21/45
  See application file for complete search history.

(56) References Cited

U.S. PATENT DOCUMENTS

| | | | |
|---|---|---|---|
| 8,027,666 | B2 | 9/2011 | Xie et al. |
| 8,763,101 | B2 | 6/2014 | Counterman |
| 9,706,408 | B2 | 7/2017 | Hawkes et al. |
| 2007/0143227 | A1 | 6/2007 | Kranzley et al. |
| 2012/0284777 | A1 | 11/2012 | Eugenio et al. |
| 2015/0334108 | A1 | 11/2015 | Khalil et al. |
| 2016/0021635 | A1* | 1/2016 | Lee ........... H04W 12/04 455/411 |
| 2018/0020351 | A1* | 1/2018 | Lee ........... H04W 12/04 |
| 2019/0174314 | A1* | 6/2019 | Joseph ........ H04W 12/065 |
| 2019/0394633 | A1* | 12/2019 | Castellanos Zamora .......... H04W 8/04 |
| 2020/0008047 | A1* | 1/2020 | Castellanos Zamora .......... H04W 8/20 |
| 2023/0217241 | A1* | 7/2023 | Velev ........ H04W 8/20 455/414.1 |

FOREIGN PATENT DOCUMENTS

| | | |
|---|---|---|
| RU | 2407181 C1 | 12/2010 |
| WO | WO-2014/053197 A1 | 4/2014 |
| WO | WO 2016/001035 A1 | 1/2016 |

OTHER PUBLICATIONS

3GPP TSG-SA WGS Meeting #88"LS on Security aspects of ECIES for concealing IMSI or SUPI" (Aug. 7-11, 2017) (Year: 2017).*
[Draft] LS on Security Aspects of ECIES For Concealing IMSI or SUPI, S3-171789, 3GPP TSG-SA WG3 Meeting #88, Ericsson (Aug. 2017) 2 pages.
23.501: SUPI Terminology Correction, S2-175964, SA WG2 Meeting #122bis, Nokia et al. (Aug. 2017) 3 pages.
3rd Generation Partnership Project; Technical Specification Group Services and System Aspects; Procedures for the 5G System; Stage 2 (Release 15), 3GPP TS 23.502 v15.1.0 (Mar. 2018), 285 pages.
3rd Generation Partnership Project; Technical Specification Group Core Network and Terminals; Non-Access_Stratum (NAS) Protocol for 5G System (5GS); Stage 3 (Release 15), 3GPP TS 24.501 v1.0.0 (Mar. 2018), 253 pages.
3rd Generation Partnership Project; Technical Specification Group Core Network and Terminals; Numbering, Addressing and Identification (Release 15), 3GPP TS 23.003 v15.3.0 (Mar. 2018), 118 pages.
3rd Generation Partnership Project; Technical Specification Group Services and System Aspects; 3GPP System Architecture Evolution (SAE); Security Architecture (Release 15), 3GPP TS 33.401 v.15.3.0 (Mar. 2018), 163 pages.
3rd Generation Partnership Project; Technical Specification Group Services and System Aspects; Security Architecture and Procedures for 5G System (Release 15), 3GPP TS 33.501 v15.0.0 (Mar. 2018), 128 pages.
3rd Generation Partnership Project; Technical Specification Group Services and System Aspects; System Architecture for the 5G System; Stage 2 (Release 15), 3GPP TS 23.501 v15.1.0 (Mar. 2018), 201 pages.
International Preliminary Report on Patentability (Chapter II) for Application No. PCT/EP2019/058530 dated Sep. 29, 2020, 5 pages.
International Search Report and Written Opinion for Application No. PCT/EP2019/058530 dated Jul. 22, 2019, 13 pages.
RFC 7542—The Network Access Identifier [online] [retrieved Oct. 1, 2020]. Retrieved from the Internet: <URL: https://tools.ietf.org/pdf/rfc7542.pdf>. (May 2015), 30 pages.
Office Action and Search Report for Russian Application No. 2020132884/07 dated Jan. 29, 2021, 11 pages.
First Examination Report for Indian Application No. 201841013099 dated Dec. 20, 2020, 6 pages.
Office Action for Chilean Application No. 202002557 dated Nov. 15, 2021, 16 pages.
SA WG3, "LS on Security Aspects of ECIES for Concealing IMSI or SUPI", 3GPP TSG-SA WG3 Meeting #88, Tdoc S3-172106, (Aug. 7-11, 2017), 2 pages.
Decision to Grant for ARIPO Application No. AP/P/2020/012654 dated Oct. 19, 2020, 6 pages.
Examination Report for Australian Application No. 2019249884 dated May 27, 2021, 3 pages.
Notice of Acceptance for Australian Application No. 2019249884 dated Sep. 8, 2021, 3 pages.
Office Action for Canadian Application No. 3,096,143 dated Nov. 4, 2020, 7 pages.
Office Action for Chinese Application No. 201980024618.2 dated May 7, 2021, 5 pages.
Examination Report for Indian Application No. 202027047909 dated Dec. 7, 2021, 5 pages.
3GPP TSG CT WG1, "Presentation of Specification to TSG: 3GPP TS 24.501 v1.0.0 on Non-Access-Stratum (NAS) Protocol for 5G System (5GS); Stage 3", 3GPP TSG CT Meeting #79, CP-180101, (Mar. 19-20, 2018), 2 pages.
Office Action for Japanese Application No. 2020-554296 dated May 20, 2021, 6 pages.
Office Action for Korean Application No. 10-2020-7030170 dated Feb. 15, 2021, 7 pages.
Notice of Allowance for Korean Application No. 10-2020-7030170 dated Jun. 25, 2021, 3 pages.
Decision to Grant for Russian Application No. 2020132884 dated Jun. 23, 2021, 12 pages.
Office Action for Chinese Application No. 201980024618.2 dated Nov. 30, 2021, 7 pages.
Decision to Grant for Japanese Application No. 2020-554296 dated Feb. 16, 2022, 5 pages.
Decision to Grant for Chinese Application No. 201980024618.2 dated Mar. 8, 2022, 4 pages.
Notice of Allowance for Philippine Application No. 1/2020/551613 dated Jun. 9, 2022, 3 pages.
Office Action for Chilean Application No. 202002557 dated Mar. 11, 2022, 12 pages.
Office Action for Canadian Application No. 3,096,143 dated Oct. 5, 2022, 3 pages.
Office Action for Egyptian Application No. 1553 2020 dated Nov. 15, 2022.
Notice of Allowance for Chilean Application No. 2020-002557 dated May 19, 2023, 2 pages.
Office Action for Egyptian Application No. 1553/2020 dated Mar. 30, 2023, 8 pages.
Extended European Search Report for European Application No. 22191663.8 dated Dec. 5, 2022, 10 pages.

(56) References Cited

OTHER PUBLICATIONS

Office Action for Indonesian Application No. P00202201169 dated Aug. 25, 2023, 6 pages.
Notice of Hearing for Indian Application No. 201841013099 dated Aug. 16, 2023, 2 pages.
Office Action for Japanese Application No. 2022-067702 dated Jun. 26, 2023, 7 pages.
Notice of Allowance for Mexico Application No. MX/a/2020/010429 dated Jul. 16, 2021, 6 pages.
Office Action for Philippine Application No. 1/2020/551613 dated Mar. 18, 2022, 4 pages.

* cited by examiner

| Subscription identifier (SUCI, SUPI, IMSI) |||
|---|---|---|
| MCC 602 | MNC 604 | UDM Selection parameter 606 |
| Identifier type SUPI/SUCI/IMSI 608 | Length of encrypted MSIN 610 | encrypted MSIN 612 |
| MSIN MAC 614 | Profile Selection 616 | |

UNIFIED SUBSCRIPTION IDENTIFIER MANAGEMENT IN COMMUNICATION SYSTEMS

CROSS-REFERENCE TO RELATED APPLICATIONS

This application is a national phase entry of International Application No. PCT/EP2019/058530, filed Apr. 4, 2019, which claims priority to India Application No. 201841013099, filed Apr. 5, 2018, the entire contents of which are incorporated herein by reference.

FIELD

The field relates generally to communication systems, and more particularly, but not exclusively, to user subscription identifier management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 3GPP Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet). Furthermore, 5G network access procedures are described in 3GPP Technical Specification (TS) 23.502, V15.1.0, entitled "Technical Specification Group Services and System Aspects; Procedures for the 5G System," the disclosure of which is incorporated by reference herein in its entirety. Still further, 3GPP Technical Specification (TS) 33.501, V0.7.0, entitled "Technical Specification Group Services and System Aspects; Security Architecture and Procedures for the 5G System," the disclosure of which is incorporated by reference herein in its entirety, further describes security management details associated with a 5G network.

In 5G networks, a 5G compatible UE may include a Concealed Subscription Identifier (SUCI) as described in 3GPP TS 33.501 during the Registration Request procedure described in 3GPP TS 23.502. SUCI is the concealed (encrypted) form of the Subscriber Permanent Identifier (SUPI). In the legacy 4G (LTE) networks, the subscription identifier used is an International Mobile Station Identifier (IMSI) as defined in 3GPP Technical Specification (TS) 23.003, V15.3.0, entitled "Technical Specification Group Core Network and Terminals; Numbering, Addressing and Identification," the disclosure of which is incorporated by reference herein in its entirety. Management of such subscription identifiers can present significant challenges.

SUMMARY

Illustrative embodiments provide improved techniques for managing subscription identifiers in communication systems.

For example, in one illustrative embodiment, a method comprises the following step. At given user equipment in a communication system, a unified subscription identifier data structure is constructed. The unified subscription identifier data structure comprises a plurality of fields that specify information for a selected one of two or more subscription identifier types and selectable parameters associated with the selected subscription identifier type, and wherein the information in the unified subscription identifier data structure is useable by the given user equipment to access one or more networks associated with the communication system based on an authentication scenario corresponding to the selected subscription identifier type.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

Advantageously, during different authentication scenarios, the given user equipment utilizes the unified subscription identifier data structure to provide the appropriate subscription identifier (e.g., SUPI, SUCI or IMSI) and associated parameters for the given authentication scenario.

These and other features and advantages of embodiments described herein will become more apparent from the accompanying drawings and the following detailed description.

DETAILED DESCRIPTION

Embodiments will be illustrated herein in conjunction with example communication systems and associated techniques for providing subscription identifier management during authentication and other procedures in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.003 23.501, 23.502 and 33.501. Other 3GPP TS/TR documents may provide other conventional details that one of ordinary skill in the art will realize. However, while well-suited for 5G-related 3GPP standards, embodiments are not necessarily intended to be limited to any particular standards.

Illustrative embodiments are related to subscription identifier management associated with 5G networks. Prior to describing such illustrative embodiments, a general description of main components of a 5G network will be described below in the context of FIGS. 1 and 2.

Figure 1:
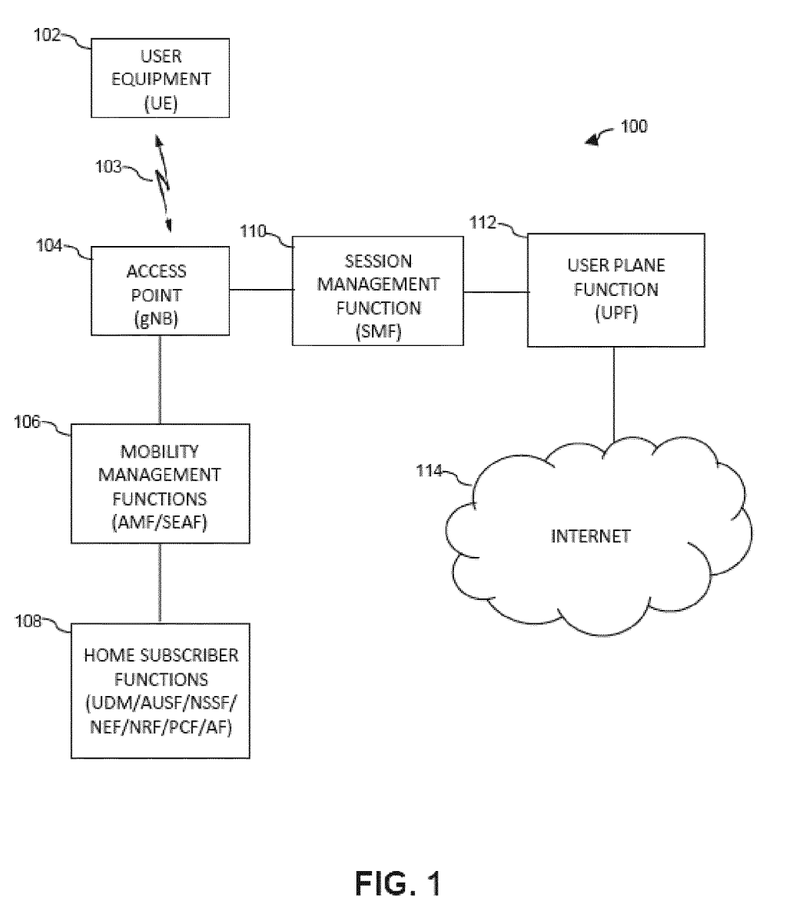
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF to allow a UE to securely connect with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively along with a 4G Home Subscriber Server or HSS) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
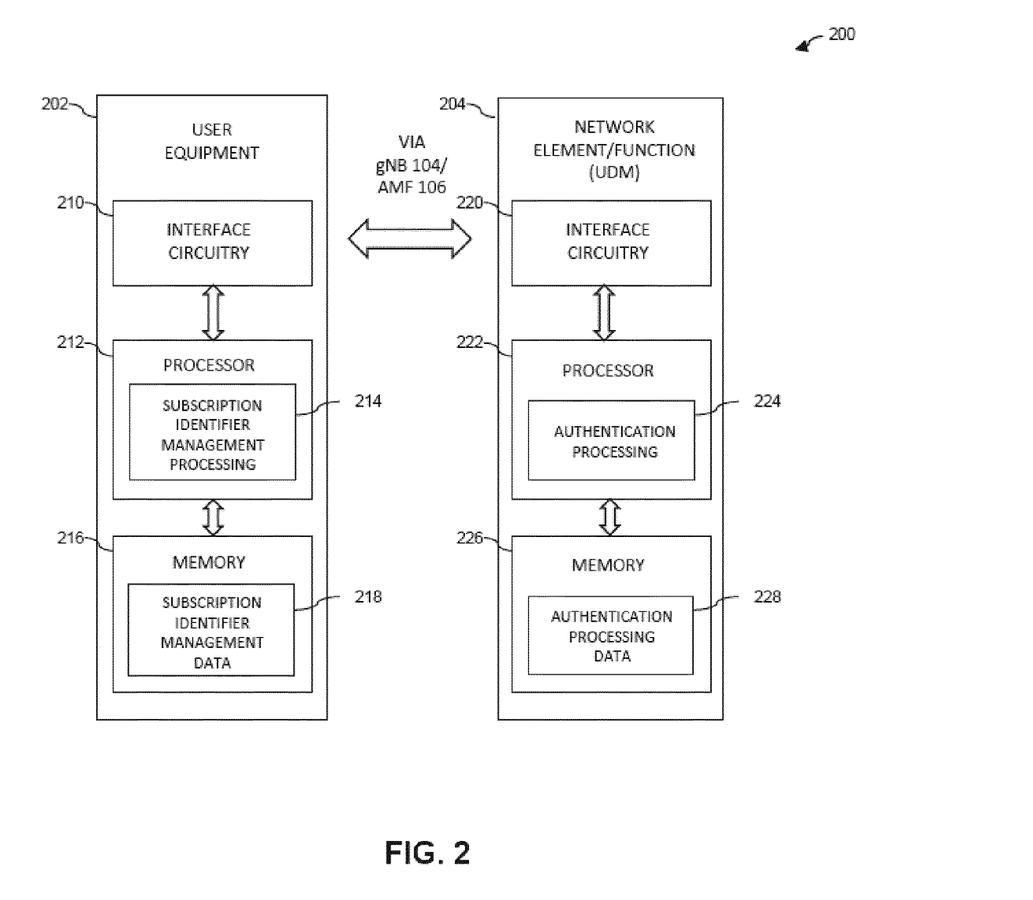
FIG. 2 illustrates user equipment and a network element/function for providing subscriber identifier management during authentication procedures with which one or more illustrative embodiments may be implemented.

FIG. 2 is a block diagram of a part of a communication system 200 comprising user equipment 202 and a network element/function 204 for providing subscription identifier management as part of an authentication procedure in an illustrative embodiment. In one embodiment, network element/function 204 can be a UDM (as described above). However, it is to be appreciated that network element/function 204 can represent any network element/function that is configurable to provide subscription identifier management and other authentication techniques described herein.

The user equipment 202 comprises a processor 212 coupled to a memory 216 and interface circuitry 210. The processor 212 of user equipment 202 includes an authentication processing module 214 that may be implemented at least in part in the form of software executed by the processor. The processing module 214 performs subscription identifier management and other related techniques described in conjunction with subsequent figures and otherwise herein. The memory 216 of user equipment 202 includes a subscription identifier management data storage module 218 that stores data generated or otherwise used during subscription identifier management and other operations.

The network element/function 204 comprises a processor 222 coupled to a memory 226 and interface circuitry 220. The processor 222 of the network element/function 204 includes an authentication processing module 224 that may be implemented at least in part in the form of software executed by the processor 222. The processing module 224 performs authentication techniques using a subscription identifier provided by the UE 202 and other techniques described in conjunction with subsequent figures and otherwise herein. The memory 226 of the network element/function 204 includes an authentication processing data storage module 228 that stores data generated or otherwise used during authentication and other operations.

The processors 212 and 222 of the respective user equipment 202 and network element/function 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective user equipment 202 and network element/function 204 may be used to store one or more software programs that are executed by the respective processors 212 and 222 to implement at least a portion of the functionality described herein. For example, subscription identifier management operations and other authentication functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective user equipment 202 and network element/function 204 illustratively comprise transceivers or other communication hardware or firmware that allows the associated system elements to communicate with one another in the manner described herein.

It is apparent from FIG. 2 that user equipment 202 is configured for communication with network element/function 204 and vice-versa via their respective interface circuitries 210 and 220. In the case that network element/function 204 is a UDM, the user equipment and UDM are operatively coupled through and communicate via gNB 104 and AMF 106 (as shown in FIG. 1). This communication involves user equipment 202 sending data to the network element/function 204, and the network element/function 204 sending data to user equipment 202. However, in alternative embodiments, more or less network elements (in addition to, or alternative to, gNB and AMF) may be operatively coupled between the network elements/functions 202 and 204. The term "data" as used herein is intended to be construed broadly, so as to encompass any type of information that may be sent between user equipment and one or more network elements/functions including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements (such as, but not limited to, other elements shown in FIG. 1) may each also be configured to include components such as a processor, memory and network interface. These elements need not be implemented on separate stand-alone processing platforms, but could instead, for example, represent different functional portions of a single common processing platform.

Given the general concepts described above, illustrative embodiments that address subscription identifier management issues will now be described.

As mentioned above, in a legacy 4G (LTE) communication system, the permanent subscription identifier is typically an International Mobile Station Identifier or IMSI of a UE. As defined in the above-referenced 3GPP TS 23.003, the IMSI consists of a Mobile Country Code (MCC), a Mobile Network Code (MNC), and a Mobile Station Identification Number (MSIN). Typically, if the subscription identifier needs to be protected, only the MSIN portion of the IMSI needs to be encrypted. The MNC and MCC portions provide routing information, used by the serving network to route to the correct home network. In a 5G communication system, the permanent subscription identifier is referred to as a Subscriber Permanent Identifier or SUPI. As with an IMSI, the SUPI may utilize an MSIN to uniquely identify the subscriber. When the MSIN of a SUPI is encrypted, it is referred to as Subscription Concealed Identifier or SUCI.

However, it is realized herein that, in different operational scenarios, the UE may need to represent the subscription identifier as a SUCI, a SUPI or an IMSI. To address these and other subscription identifier management issues, illustrative embodiments propose a unified representation structure for the subscription identifier.

More particularly, illustrative embodiments address the challenge of using the appropriate subscription identifier representation, i.e., SUPI or its encrypted form SUCI or even IMSI, in the Registration Request message sent by the UE to the network and UE Authentication procedure in 5G network (note that the same or similar unified data structure can be exchanged between network entities). For example, a UE while performing the 5G Authentication and Key Agreement (AKA) procedure (see e.g., the above-referenced 3GPP TS 33.501) may need to present the subscription identifier in three different formats SUCI, SUPI or IMSI. If the authentication procedure is using Extensible Authentication Protocol (EAP) AKA' procedure (see e.g., the above-referenced 3GPP TS 33.501), then the representation uses the Network Access Identifier (NAI) format, i.e., "joe@example.com" as defined in the Internet Engineering Task Force (IETF) Request for Comment (RFC) 7542, "The Network Access Identifier" May 2015, the disclosure of which is incorporated by reference herein in its entirety.

The challenge of different subscription identifier formats is not addressed in the above-referenced TS 33.501, nor any other Stage 3 specifications. In 3GPP Technical Specification (TS) 33.401, V15.3.0, entitled "Technical Specification Group Services and System Aspects; 3GPP System Architecture Evolution (SAE); System architecture," the disclosure of which is incorporated by reference herein in its entirety, only usage of IMSI is defined.

Figures 3A, 3B:
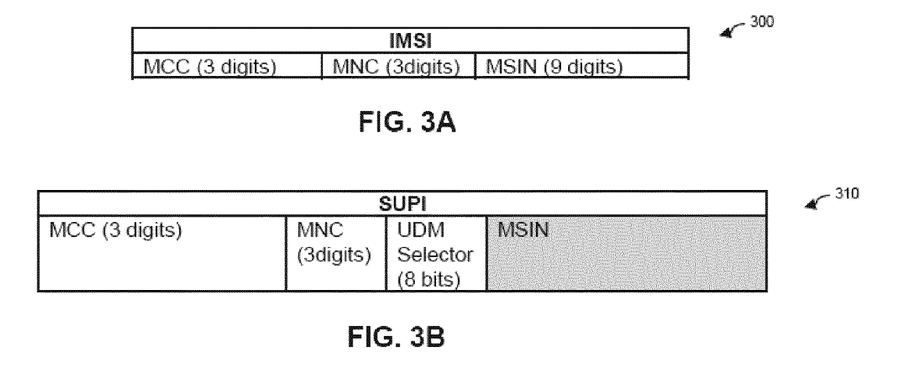
FIG. 3A illustrates an IMSI format with which one or more illustrative embodiments may be implemented.
FIG. 3B illustrates a SUPI format with which one or more illustrative embodiments may be implemented.

FIG. 3A illustrates an IMSI format 300 with which one or more illustrative embodiments may be implemented. As shown, the format 300 includes a fixed 15-digit length and consists of a 3-digit Mobile Country Code (MCC), a 3-digit Mobile Network Code (MNC), and a 9-digit Mobile Station Identification Number (MSIN). In some cases, the MNC can be 2 digits, while the MSIN is 10 digits. Further details about the IMSI are defined in the above-referenced 3GPP TS 23.003.

As explained above, if the authentication procedure is using an EAP-AKA' procedure or an EAP Transport Layer Security (TLS) procedure (each defined in the above-referenced 3GPP TS 33.501), then the subscription identifier representation uses the NAI format. RFC 7542 specifies that, for 3GPP, the "username" portion is a unique identifier that is derived from device-specific information and the "realm" portion is composed of information about the home network followed by the base string "3gppnetwork.org". For example, the subscription identifier in the NAI format can be represented as follows:

234150999999999@ims.mnc015.mcc234.3gppnetwork.org

Therefore, for the EAP-AKA' procedure, the UE will encode its subscription identifier SUPI or SUCI in the NAI format as specified in RFC 7542, e.g. MSIN@mnc.mcc.3gppnetwork.org.

Figure 3C:
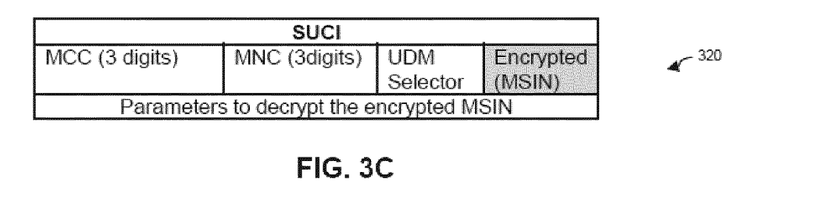
FIG. 3C illustrates a SUCI format with which one or more illustrative embodiments may be implemented.

FIGS. 3B and 3C respectively illustrate a SUPI format 310 and a SUCI format 320 with which one or more illustrative embodiments may be implemented. In this example, SUPI format 310 includes an MCC field (3 digits), and MNC field (3 digits), an MSIN and a UDM selector (8 bits). The SUCI format 320 is an encrypted form of the SUPI format 310 and, as shown, includes an MCC field (3 digits), and MNC field (3 digits), a UDM selector field, an encrypted MSIN, and parameters to decrypt the encrypted MSIN.

It has been agreed in 3GPP SA3 to support at least two Elliptic curves, Elliptic Curve Integrated Encryption Scheme (ECIES) Curve A and Curve B to encrypt the MSIN part of the SUPI while the encrypted identifier is used as the SUCI. In future releases, 3GPP may specify more or less curves from the Elliptic Curve Cryptography (ECC) family of curves or may allow use of proprietary curves to be utilized to encrypt the MSIN. It is realized, however, that while using standardized schemes is preferred, a network operator may also decide to use its own specific encryption method. Further, particularly in the transition phase, the network operator may configure devices to use only null-scheme for SUCI. The null-scheme is implemented such that it returns the same output as the input, which applies to both encryption and decryption (i.e., the MSIN is not encrypted). Null-scheme is indicated by the scheme identifier in the SUCI and thus, can be presented by the unified subscription identifier format in an equal manner.

Since the concealed subscription identifier SUCI is exchanged between the UE (102 in FIG. 1) and the UDM (part of 108 in FIG. 1) in the core network, the UDM should be configured to be able to understand how the UE has coded the MSIN. Thus, the method of encoding should be part of the exchanged format along with the encoded output itself, since there are no other message exchanges between the UE and the UDM during the authentication process. Therefore, it is realized that a scheme to represent the SUCI should support a flexible representation to accommodate multiple fields, each field flexible enough to support multiple options.

Illustrative embodiments address the above and other challenges by providing a unified structure to represent the subscription identifier. For example, a unified structure in one illustrative embodiment may represent subscription identifiers such as SUCI, SUPI and IMSI, as well as various options associated with each identifier's use during authentication and other operations.

Figure 4:
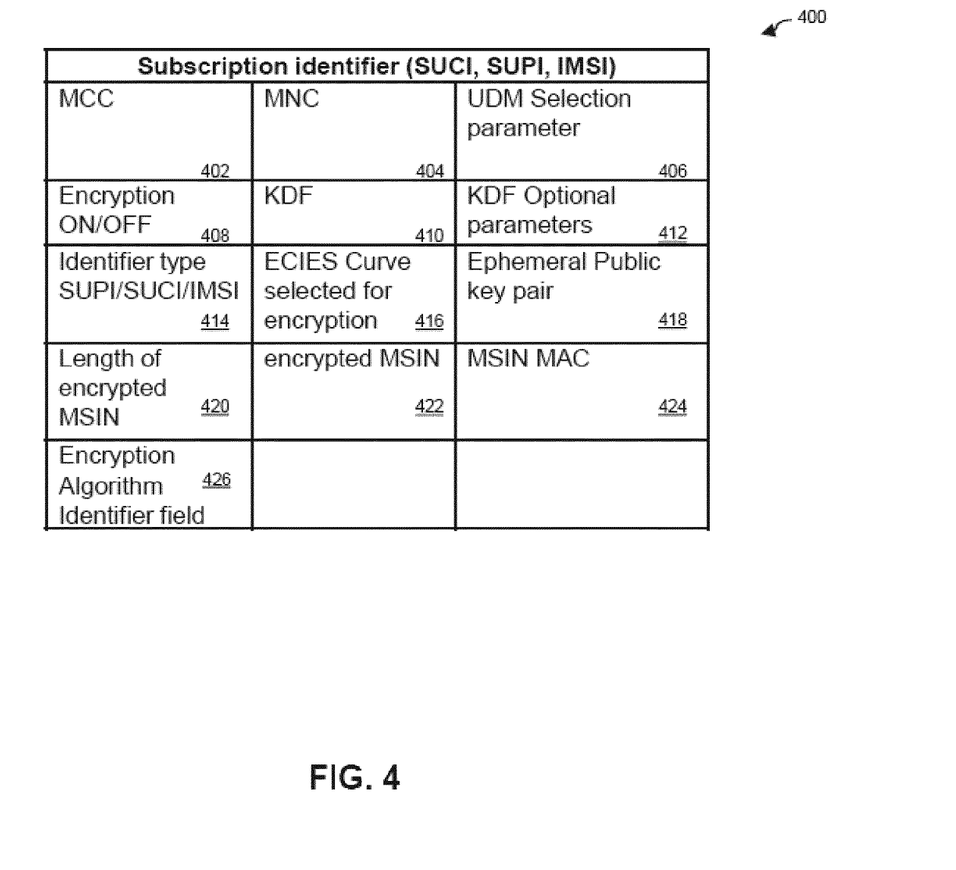
FIG. 4 illustrates a unified subscription identifier format, according to an illustrative embodiment.
Figure 5:
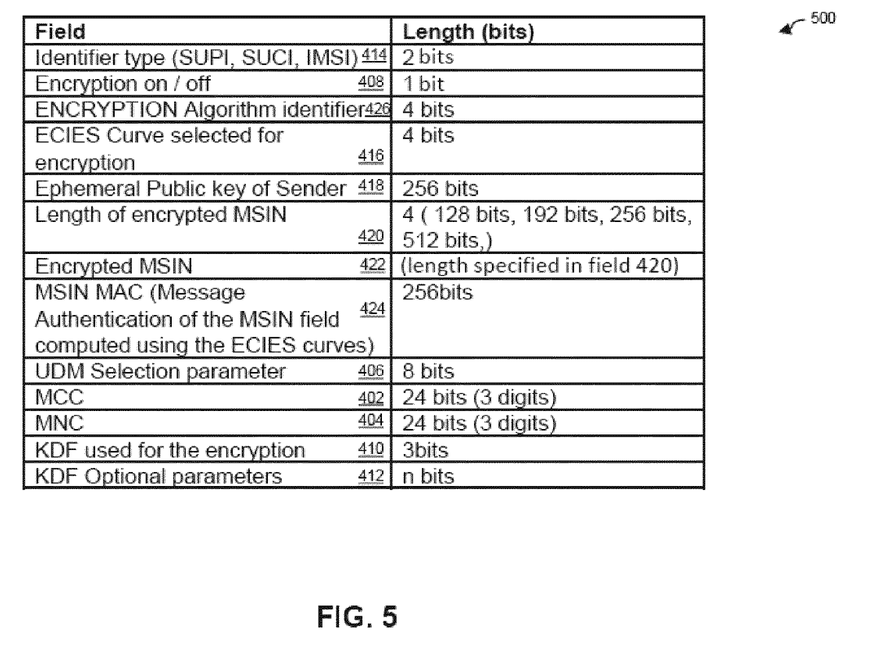
FIG. 5 illustrates exemplary field lengths of a unified subscription identifier format, according to an illustrative embodiment.

FIG. 4 illustrates a unified subscription identifier format (data structure) 400, according to an illustrative embodiment. Further, FIG. 5 illustrates exemplary field lengths 500 for each field shown in the unified subscription identifier format 400 of FIG. 4.

As shown, unified subscription identifier format 400 comprises the following fields (with exemplary field lengths in parentheses):

MCC field 402 (24 bits/3 digits);
MNC field 404 (24 bits/3 digits);
UDM Selection Parameter field 406 (8 bits);
Encryption ON/OFF field 408 (1 bit);
KDF (Key Derivation Function) field 410 (3 bits);
KDF Optional Parameter field 412 (n bits/dependent on the optional parameter);
Identifier type SUPI/SUCI/IMSI field 414 (2 bits);
ECIES Curve selected for encryption field 416 (4 bits);
Ephemeral Public Key Pair field 418 (256 bits);
Length of Encrypted MSIN field 420 (4 bits/128, 192, 256, 512 bits/dependent on MSIN format);
MSIN or Encrypted MSIN field 422 (length as specified in field 420);
MSIN MAC (Message Authentication Code of the MSIN field computed using the selected ECIES curves) field 424 (256 bits); and
Encryption Algorithm Identifier field 426 (4 bits).

It is to be appreciated that the field lengths described herein are illustrative in nature and thus not intended to be limiting. Depending on the operational scenarios in which the UE and the 5G network function, the field lengths may be set to different values. It is to also be appreciated that, in alternative embodiments, one or more other fields can be added to the data structure and/or some of the above fields can be deleted and/or simply not used. Also, the field placement within the structure format 400 in FIG. 4 is exemplary in nature and, thus, alternative field arrangements are contemplated in other embodiments. By way of example only, one additional field that can be part of the data structure (or indicated in the UDM selection or other field) is a Network Slice Selection Assistance Information (NSSAI) field.

Figure 6:
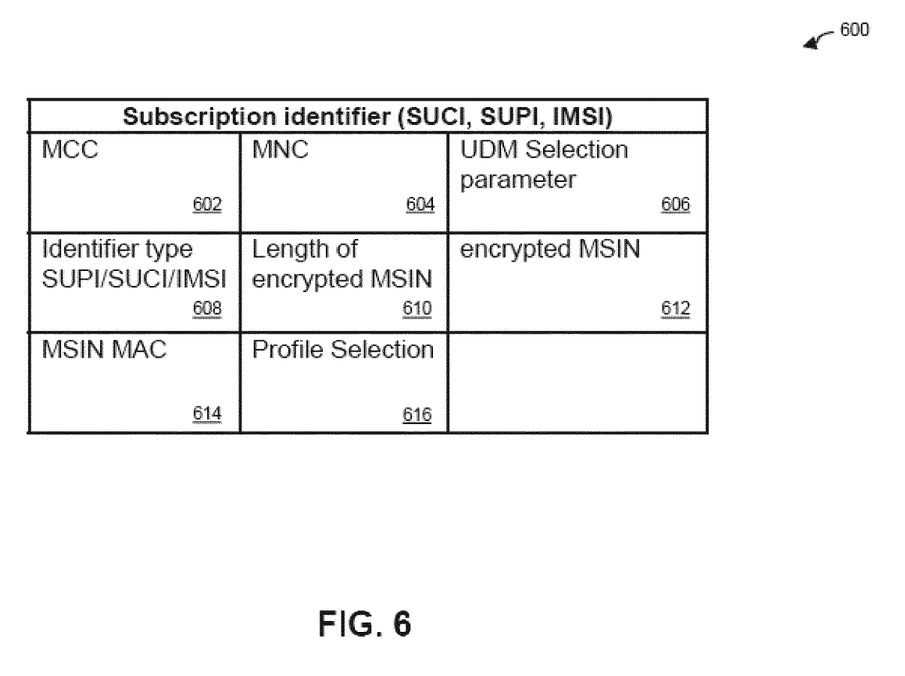
FIG. 6 illustrates a unified subscription identifier format, according to another illustrative embodiment.

While some illustrative embodiments provide for the UE to send the full unified subscription identifier data structure (i.e., 400 in FIG. 4) to a given UDM (or one or more other network entities), alternative illustrative embodiments avoid the transport of many indicative parameters such as, for example, KDF, KDF optional parameters, selected elliptic curve, encryption algorithm identifier, etc. to minimize transmission overhead. As such, an alternative illustrative unified subscription identifier data structure 600 is depicted in FIG. 6. As shown, unified subscription identifier format 600 comprises the following fields (with exemplary field lengths in parentheses):

MCC field 602 (24 bits/3 digits);
MNC field 604 (24 bits/3 digits);
UDM Selection Parameter field 606 (8 bits);
Identifier type SUPI/SUCI/IMSI field 608 (2 bits);
Length of Encrypted MSIN field 610 (4 bits/128, 192, 256, 512 bits/dependent on MSIN format);
MSIN or Encrypted MSIN field 612 (length as specified in field 610);
MSIN MAC (Message Authentication Code of the MSIN field computed using the selected ECIES curves) field 614 (256 bits); and
Profile Selection field 616 (4 bits).

It is to be appreciated that the field lengths described herein are illustrative in nature and thus not intended to be limiting. Depending on the operational scenarios in which the UE and the 5G network function, the field lengths may be set to different values. It is to also be appreciated that, in alternative embodiments, one or more other fields can be added to the data structure and/or some of the above fields can be deleted and/or simply not used. Also, the field placement within the structure format 600 in FIG. 6 is exemplary in nature and, thus, alternative field arrangements are contemplated in other embodiments. By way of example only, one additional field that can be part of the data structure (or indicated in the UDM selection or other field) is a Network Slice Selection Assistance Information (NSSAI) field.

Fields 602 through 614 provide the same information as their identically-named counterparts in data structure 400. However, data structure 600 comprises profile selection field 616. It is realized that it may be beneficial to pre-establish certain standard profiles to be used in the unified subscription identifier representation format between the UE and the UDM. These agreed profiles may be defined as pre-set values (by way of example only, the 4-bit ECIES Curve selected for the encryption field). In such a case, the agreed values from the profiles will be used by the sender UE and the UDM avoiding actual exchange of values for these parameters.

For example, in such a profile-based reduced fields version of the unified subscription identifier data structure, the UDM would be configured to know that a given profile selection field of "0011" (if 4 bits) corresponds to certain predetermined settings for the fields from the FIG. 4 format that are not sent in the reduced field version of FIG. 6, while a profile selection field of "1010" would mean different predetermined settings, etc. Thus, the UDM could pre-store (or obtain in real-time) the data structure for each possible profile that a UE could send (since UEs are configured to select different authentication scenarios).

Illustrative embodiments provide for all UEs (e.g., 102 in FIG. 1) and network elements/functions such as, but not limited to, gNB (104 in FIG. 1), AMF (part of 106 in FIG. 1), SEAF (part of 106 in FIG. 1), AUSF (part of 108 in FIG. 1) and UDM (part of 108 in FIG. 1), to support unified subscription identifier formats 400 and 600, as well as alternative variations.

Figure 7:
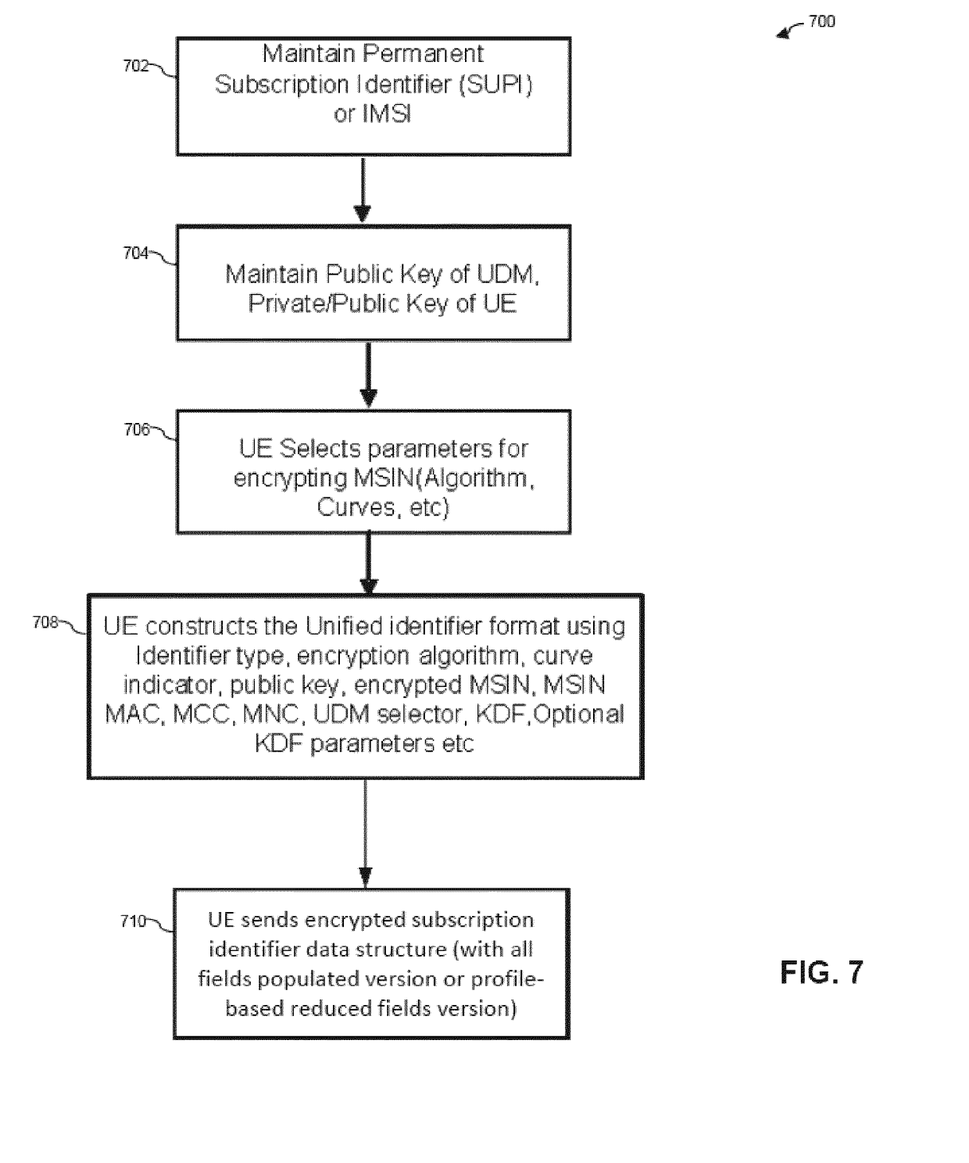
FIG. 7 illustrates a user equipment methodology for utilizing a unified subscription identifier format, according to an illustrative embodiment.

FIG. 7 illustrates a methodology 700 for utilizing a unified subscription identifier format (e.g., data structure 400 of FIG. 4 or data structure 600 of FIG. 6) from the perspective of the UE, according to an illustrative embodiment.

In step 702, the UE maintains a permanent subscription identifier (SUPI) or IMSI.

In step 704, the UE maintains a public key of the UDM as well as its own private/public key pair.

In step 706, the UE selects parameters for encrypting MSIN (algorithm, curves, etc.).

In step 708, the UE constructs the unified subscription identifier data structure (e.g., 400 in FIG. 4) using identifier type, encryption algorithm, curve indicator, public key, encrypted MSIN, MSIN MAC, MCC, MNC, UDM selector, KDF, optional KDF parameters, etc.

In step 710, the UE sends the unified subscription identifier data structure to the selected UDM during a network access request (e.g., Registration Request). In one embodiment, the unified subscription identifier data structure may be data structure 400 of FIG. 4 (i.e., all fields populated version), while in an alternative embodiment, the unified subscription identifier data structure may be data structure 600 of FIG. 6 (profile-based reduced fields version). Other variations of the unified subscription identifier data structure may be sent in further alternative embodiments. Network entities (e.g., UDM) are also configured to construct or otherwise obtain/maintain such unified subscription identifier data structures.

Figure 8:
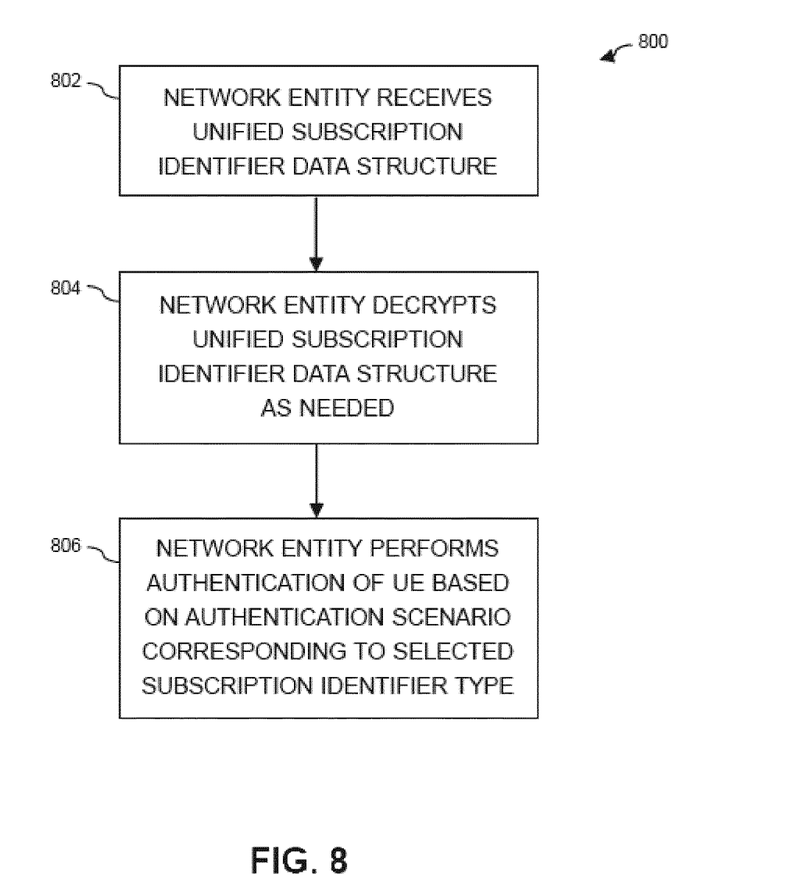
FIG. 8 illustrates a network entity methodology for utilizing a unified subscription identifier format, according to an illustrative embodiment.

FIG. 8 illustrates a methodology 800 for utilizing a unified subscription identifier format (e.g., data structure 400 of FIG. 4 or data structure 600 of FIG. 6) from the perspective of a network entity (e.g., one or more of the network elements/functions described herein), according to an illustrative embodiment.

In step 802, the network entity receives a unified subscription identifier data structure.

In step 804, the network entity decrypts the unified subscription identifier data structure as needed.

In step 806, the network element performs authentication of the sender UE based on the authentication scenario corresponding to the selected subscription identifier type in the received data structure.

It should therefore again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. A user equipment for a wireless communication system, the user equipment comprising:
   at least one processor; and
   at least one memory storing instructions that, when executed by the at least one processor, cause the user equipment to perform at least:
   constructing, at the user equipment in the wireless communication system, a unified subscription identifier data structure;
      storing the unified subscription identifier data structure, wherein the unified subscription identifier data structure comprises a plurality of fields that include at least one field specifying a selected subscription identifier type selected from a group of subscription identifier types comprising a Concealed Subscription Identifier (SUCI), a Subscriber Permanent Identifier (SUPI), and an International Mobile Station Identifier (IMSI); and
      using the unified subscription identifier data structure to access one or more networks associated with the wireless communication system based on an authentication scenario corresponding to the selected subscription identifier type,
   wherein the plurality of fields comprise a subscription identifier type field, and
   wherein the plurality of fields comprise a unified data management (UDM) selection parameter field.

2. The user equipment of claim 1, wherein the plurality of fields comprises an encryption on/off field.

3. The user equipment of claim 1, wherein the plurality of fields comprises a key derivation function field.

4. The user equipment of claim 1, wherein the plurality of fields comprises a mobile country code field.

5. The user equipment of claim 1, wherein the plurality of fields comprises a mobile network code field.

6. The user equipment of claim 1, wherein the plurality of fields comprises a field specifying a selected curve from an elliptic curve integrated encryption scheme.

7. The user equipment of claim 1, wherein the plurality of fields comprises an ephemeral public key pair field.

8. The user equipment of claim 1, wherein the plurality of fields comprises a field specifying a length of an encrypted Mobile Station Identification Number (MSIN) field.

9. The user equipment of claim 1, wherein the wireless communication system comprises a fifth-generation (5G) system.

10. The user equipment of claim 1, wherein the instructions, when executed by the at least one processor, further cause the user equipment to perform:
   sending the unified subscription identifier data structure to at least one network entity in the wireless communication system to gain access to the one or more networks associated with the wireless communication system.

11. The user equipment of claim 1, wherein the plurality of fields comprises a profile selection field.

12. The user equipment of claim 1, wherein the plurality of fields further comprise an authentication server function (AUSF) selection parameter field.

13. The user equipment of claim 2, wherein the plurality of fields comprises an encryption algorithm identifier field.

14. The user equipment of claim 3, wherein the plurality of fields comprises a key derivation function parameter field.

15. The user equipment of claim 8, wherein the plurality of fields comprises an encrypted MSIN field.

16. The user equipment of claim 8, wherein the plurality of fields comprises an MSIN message authentication code field.

17. The user equipment of claim 11, wherein the profile selection field enables the user equipment to notify one or more network entities in the one or more networks associated with the wireless communication system to use pre-established values for one or more selectable parameters associated with the selected subscription identifier field.

18. The user equipment of claim 17, wherein the instructions, when executed by the at least one processor, further cause the user equipment to perform:
   sending the unified subscription identifier data structure with the profile selection field and a reduced set of fields to at least one of the one or more network entities in the wireless communication system to gain access to the one or more networks associated with the wireless communication system.

19. A method comprising:
   constructing, at a user equipment in a wireless communication system, a unified subscription identifier data structure;
      storing the unified subscription identifier data structure, wherein the unified subscription identifier data structure comprises a plurality of fields that include at least one field specifying a selected subscription identifier type selected from a group of subscription identifier types comprising a Concealed Subscription Identifier (SUCI), a Subscriber Permanent Identifier (SUPI), and an International Mobile Station Identifier (IMSI); and using the selected one of two or more subscription identifier fields in the unified subscription identifier data structure to access one or more networks associated with the wireless communication system based on an authentication scenario corresponding to the selected subscription identifier type, wherein the plurality of fields comprise a subscription identifier type field, and wherein the plurality of fields comprise a unified data management (UDM) selection parameter field.

20. The method of claim 19, wherein the plurality of fields further comprise an authentication server function (AUSF) selection parameter field.

21. A non-transitory computer-readable storage medium having embodied therein executable program code that when executed by a processor causes the processor to:

construct, at a user equipment in a wireless communication system, a unified subscription identifier data structure;

store the unified subscription identifier data structure, wherein the unified subscription identifier data structure comprises a plurality of fields that include at least one field specifying a selected subscription identifier type selected from a group of subscription identifier types comprising a Concealed Subscription Identifier (SUCI), a Subscriber Permanent Identifier (SUPI), and an International Mobile Station Identifier (IMSI); and use the selected one of two or more subscription identifier fields in the unified subscription identifier data structure to access one or more networks associated with the wireless communication system based on an authentication scenario corresponding to the selected subscription identifier type, wherein the plurality of fields comprise a subscription identifier type field, and wherein the plurality of fields comprise a unified data management (UDM) selection parameter field.

22. The non-transitory computer-readable storage medium of claim 21, wherein the plurality of fields further comprise an authentication server function (AUSF) selection parameter field.

* * * * *

UNITED STATES PATENT AND TRADEMARK OFFICE
CERTIFICATE OF CORRECTION

| | | |
|---|---|---|
| PATENT NO. | : 11,902,792 B2 | |
| APPLICATION NO. | : 17/045370 | |
| DATED | : February 13, 2024 | |
| INVENTOR(S) | : Suresh Nair et al. | |

It is certified that error appears in the above-identified patent and that said Letters Patent is hereby corrected as shown below:

In the Claims

In Column 11, Line 55, Claim 1, delete "Concealed Subscription" and insert -- Subscription Concealed --, therefor.

In Column 12, Line 67, Claim 19, delete "Concealed Subscription" and insert -- Subscription Concealed --, therefor.

In Column 14, Line 6, Claim 21, delete "Concealed Subscription" and insert -- Subscription Concealed --, therefor.

Signed and Sealed this
Twenty-second Day of October, 2024

Katherine Kelly Vidal
*Director of the United States Patent and Trademark Office*